United States Patent Office 3,453,314
Patented July 1, 1969

3,453,314
PRODUCTION OF PROPIONITRILE
Karl Smeykal, Leuna, Heinrich Pallutz, Bad Durrenberg, Eberhard Hahner, Halle, Karl Becker, Leuna, and Werner Stoss, Leipzig, Germany, assignors to VEB Leuna-Werke "Walter Ulbricht," Leuna, Germany
No Drawing. Filed Aug. 1, 1966, Ser. No. 569,060
Int. Cl. C07c 121/02, 121/16
U.S. Cl. 260—465.1
5 Claims

ABSTRACT OF THE DISCLOSURE

For the preparation of propionitrile by catalytic hydrogenation of acrylontrile at a temperature of about 50 to 120° C. and under superatmospheric pressure there is provided a new catalyst composition the active components of which are at least one of metallic nickel and metallic cobalt plus at least one of a molybdenum oxide, a chromium oxide and a tungsten oxide.

---

The present invention relates to the production of propionitrile, and more particularly to a method for catalytically hydrogenating acrylonitrile under pressure to obtain propionitrile.

Catalytic hydrogenation of acrylonitrile has been used for a long time for production of propionitrile, the product resulting from the catalytic hydrogenation being a technical bulk product which is suitable on a crude basis for the production of large amounts of propionitrile.

It is known that the catalytic hydrogenation of acrylonitrile to propionitrile can be carried out in the presence of metallic copper without excess pressure at 200° C., or in the presence of Raney nickel at pressures of at least 6 atmospheres and in a temperature range of 20–75° C. These processes do lead to the hydrogenation of acrylonitrile to propionitrile, however, the utilized catalysts quickly lose their activity which, from the standpoint of technical carrying out of the hydrogenation, because of the necessary large amounts of catalysts to be used, is of considerable disadvantage.

It is also known that these disadvantages can be avoided by using as catalyst the active sulfides of the 6th and 8th sub-groups of the periodic system, and by carrying out the hydrogenation of the acrylonitrile under increased pressure of for example 50 atmospheres and more, and at a temperature range of about 130–200° C. These catalysts have a long duration of action, for example 160 days and more, and consequently can be used for the carrying out of continuous processes over a long period of time. However, despite the long duration of catalytic action of the mentioned sulfide catalysts, in actual practice the carrying out of the process must be terminated after a relatively short period of time because the acrylonitrile easily polymerizes to high molecular solid substances which causes a considerable increase in the resistance to the stream in the catalyst bed and eventually has the effect of causing a stopping-up of the reactors. In such cases, the catalyst must then, despite their still strong remaining catalytic activity, be removed. This procedure is therefore, as a result of formed polyacrylonitrile which, as a hard mass, encrusts the catalyst, faced with considerable mechanical difficulties.

It is accordingly a primary object of the present invention to provide a method of producing propionitrile by the catalytic hydrogenation of acrylonitrile which avoids all of the above enumerated difficulties.

It is another object of the present invention to provide a process for the catalytic hydrogenation of acrylonitrile to propionitrile in a continuous manner and in high yield using the catalyst for a long period of time, without any disturbances resulting from the formation of undesired polymerization products.

It is yet a further object of the present invention to provide new catalyst compositions for the catalytic hydrogenation of acrylonitrile to propionitrile.

Other objects and advantages of the present invention will be apparent from a further reading of the specification and of the appended claims.

With the above and other objects in view, the present invention mainly comprises the catalytic hydrogenation of acrylonitrile to propionitrile under superatmospheric pressure in the presence of a catalyst comprising at least one metal selected from the group consisting of nickel and cobalt plus at least one metallic oxide of a metal of the 6th sub-group of the periodic system. Thus, either nickel alone plus an oxide of a metal of the 6th sub-group of the periodic system can be used, or cobalt alone plus an oxide of a metal of the 6th sub-group of the periodic system can be used, or nickel plus cobalt and an oxide of a metal of the 6th sub-group of the periodic system can be used. When nickel and cobalt are used together, then the proportion of nickel to cobalt can be any proportion whatsoever.

The catalytic hydrogenation of the acrylonitrile to propionitrile using the catalyst composition of the present invention is preferably carried out at a temperature of about 50–120° C. and at a pressure of at least 10 atmoshperes.

In addition to the metallic nickel and/or cobalt plus the oxide of the metal of the 6th sub-group of the periodic system, the catalyst compositions of the present invention can also include a carrier substance such as alumina, possibly in the form of argillaceous earth, kieselguhr or diatomaceous earth, aluminium silicate or pumice.

The catalyst compositions of the present invention may be obtained, for example, by reduction of mixtures of oxides of a metal of the 6th sub-group of the periodic system with oxides of nickel and/or cobalt, the reduction being carried out by hydrogen or hydrogen-containing gases at a temperature of about 350–600° C.

Metal oxide mixtures of this type can be obtained by mechanical mixing of the components. Of particular value are mixtures of 10–90% by weight of nickel oxide and 90–10% by weight of tungsten trioxide, preferably 20–80% by weight of nickel oxide and 80–20% by weight of the tungsten trioxide. Also suitable are nickel and cobalt salts of oxygen acids of the metals of the 6th sub-group of the periodic system, such as nickel chromate and cobalt chromate, nickel tungstate and cobalt tungstate, as well as nickel molybdate and cobalt molybdate, using such salts as starting materials for the production of the catalyst compositions by reduction thereof with hydrogen at a temperature of about 350–600° C., preferably about 380–550° C. The reduction proceeds quite easily.

Particularly suitable highly active and selective catalysts are obtained by mixing carbonates of nickel and/or cobalt with the oxygen acids of the metals of the 6th sub-group of the periodic system, such as tungstic acid or molybdic acid, in aqueous suspension, heating to about 80–90° C., drying at about 130–190° C., and reducing the resulting mixture with hydrogen at about 350–600° C., preferably 380–550° C. Combinations of metallic nickel with tungstic acid which are obtained by a hydrogen treatment as above described, for example a composition of 2 Ni±WO$_3$, are particularly active. Such catalysts can be in pulverulent form, or can be used in the form of cakes, tablets or pellets.

The hydrogenation of the acrylonitrile can be carried out discontinuously in an autoclave in liquid phase, or continuously by conducting vapors of acrylonitrile and hydrogen over the solid arranged catalyst pieces of the type mentioned above. The hydrogenation can also be carried out in the presence of finely granular catalysts by the use of the fluidized bed technique. The carrying out of the hydrogenation by spraying over pieces of catalysts of only partially evaporated acrylonitrile is also possible because the catalysts even in reduced condition have sufficient mechanical strength. Furthermore, the hydrogenation of the acrylonitrile in liquid phase with suspended pulverulent catalysts of the type described herein is also possible.

The hydrogenation reaction is preferably carried out with a large excess of hydrogen under superatmospheric pressure, for example a pessure of 10 atmospheres and higher, and preferably in continuous manner. The take-up of hydrogen starts, when using the catalysts of the present invention, at a temperature as low as 50° C., and is completed at temperatures of 90–120° C. By reason of the possibility of using this extraordinarily low temperature range for the carrying out of the hydrogenation, the catalysts of the present invention differ markedly with respect to their activity and selectivity from even the best of the known catalysts, namely the sulfides of the metals of the 6th and 8th sub-groups of the periodic table, which require temperature ranges of 130–200° C., and preferably 150–160° C. for the hydrogenation reaction. As a result, it is possible to substantially completely avoid any polymerization side reaction during the hydrogenation of the acrylonitrile, which prevents the formation of undesired high molecular reaction products, and as a consequence the reaction can be carried out in continuous manner over long periods of time without the occurrence of compounds in the reactor which cause a stopping of the reaction and require a costly cleaning of the reactor before the process can continue. Thus, it is possible using the catalyst compositions of the present invention to retain the full activity and selectivity of the catalysts for running times of 8 months and more without the reactor exhibiting a resistance to the stream of fluid passing through the mass therein. Consequently, the hydrogenation of acrylonitrile using the catalyst compositions of the present invention constitutes a considerable advance as compared to the known techniques which have to put up with polymerization phenomena in the catalyst bed and consequent shortening of the running time of the continuous carrying out of the hydrogenation process.

It is quite surprising that in contrast to the use or metallic copper-containing catalysts there is practically no formation of amines using the catalyst compositions of the present invention, that is the nitrile group is, apart from an only a very short time occurring initial activity, is not attacked. Furthermore, the catalysts of the present invention are technically easier to produce than the known sulfide catalysts. Moreover, they can be reduced in very short time by hydrogen treatment, as compared to sulfide catalysts, and in situ can be regenerated with oxygen-containing gases at high temperatures.

As starting material for the method of the present invention, it is possible to use technical acrylonitrile of the usual origin. To avoid a polymerization of the acrylonitrile, for example in the storage tank or in the preheated zone, small amounts of stabilizers, such as hydroquinone, are preferably added to the starting material.

For better control of the heat of the hydrogenation reaction, it is advantageous to add the acrylonitrile dissolved in an organic solvent which is not affected by the reaction conditions, such as saturated aliphatic and cycloaliphatic hydrocarbons or alcohols, e.g. n-butanol, amylalcohol, hexyl-alcohol, heptyl-alcohol, and octyl-alcohol, as well as dissolved in a solution of the reaction product itself, namely propionitrile. From the first mentioned solvents, the formed propionitrile is preferably obtained by a rectifying distillation process. The thus obtained propionitrile can be used for the production of herbicides, dye intermediate products and pharmaceuticals.

The following examples are given to further illustrate the present invention. The scope of the invention is not, however, meant to be limited to the specific details of the examples.

EXAMPLE 1

A kneader is charged, for the production of the catalyst, with 48 kg. of nickel carbonate and 50 kg. of tungstic acid ($WO_3 \cdot H_2O$) and 10 liters of water. After one hour homogenization at room temperature, the charge is kneaded at 80–90° C. until the development of carbon dioxide has ended. The obtained mass is dried on sheets in a drying chamber at a temperature of 130–140° C. for about 26 hours, then milled and pressed into pellets. The pellets are treated with hydrogen in a reducing oven at normal pressure at 380° C. The end of the reduction is indicated when formation of water ceases, which in this case occurs after 48 hours. The catalyst is then cooled in a hydrogen stream, and stabilized with nitrogen which contains 0.5% oxygen. For the purpose of giving the catalyst a greater mechanical strength, it is milled and again pressed into pellets.

The thus obtained catalyst which consists of metallic nickel and tungstic acid is used to fill a steel catalyst tube of 20 liters capacity which is provided with a water jacket. After hydrogen has been passed over the catalyst for 48 hours at a temperature of 100° C., and at a pressure of 200 atmospheres, the temperature in the catalyst chamber is lowered to 50° C. Subsequently, per each volume part of catalyst 0.8 volume parts of a mixture of 35 volume percent of acrylonitrile and 65 volume percent of n-butanol are introduced hourly at a temperature of 75–80° C. and a pressure of 200 atm. into the apparatus in such a manner that the liquid trickles down from above and through the catalyst. Simultaneously we introduce by means of a circulating pump a throughput of 2000 volume parts of hydrogen (measured at normal pressure) per each volume part of catalyst. After the reaction mixture has cooled to 20° C., the pressure is released to atmospheric pressure and the formed propionitrile (B.P.=97° C.) is separated by rectifying distillation from the n-butanol (B.P.=117° C.). The yield of propionitrile is practically quantitative. After a running time of 8 months, there was still no visible reduction in the activity of the catalyst. Furthermore, no increase in the resistance to the stream as a result of formation of polymerisate occurred in the catalyst chamber.

EXAMPLE 2

A mixture of 30 volume percent of acrylonitrile and 70 volume percent of propionitrile are subjected to the same reaction conditions using the same catalyst as in Example 1 for the continuous hydrogenation thereof. The purification of the obtained propionitrile is carried out with the aid of a distilling column. The distillation residue amounts to less than 0.1%. The propionitrile is obtained in practically quantitative yield. After running of the process and the apparatus for 8 months there is neither any reduction in the acivity of the catalyst nor any increase in flow resistance by polymerisate formation in the catalyst chamber.

EXAMPLE 3

A mixture of 30 volume percent of acrylonitrile and 70 volume percent of n-butanol are subjected to hydrogenation at a pressure of 40 atmospheres in a trickling hydrogenation proceeding using the catalyst produced according to Example 1, the reduction of said catalyst, however, being carried out at a temperature of 480° C. The charge calculated with respect to the acrylonitrile amounts to 0.2 v./v./h., the gas:product ratio is 4000:1, and the temperature is 80–90° C. Aside from an initial formation of amine (about 0.5%), the amine content of the obtained crude product amounts to about 0.1–0.2%. The yield of propionitrile is practically quantitative.

EXAMPLE 4

Using a catalyst produced according to Example 1, a mixture of 30 volume percent of acrylonitrile and 70 volume percent of n-butanol are hydrogenated at a pressure of 10 atmospheres, a temperature of 110–120° C., a charge of 0.2 v./v./h., calculated with respect to acrylonitrile, and a gas:product ratio of 6000:1, using a trickling method. The amine content of the obtained crude product during the first hour of the test amounts to about 0.6% and then drops very quickly to about 0.1–0.2%. The propionitrile is obtained in practically quantitative yield.

EXAMPLE 5

A catalyst is produced by mixing 25% by weight of nickel oxide with 75% by weight of tungsten trioxide in pulverulent form and subsequently reducing the mixture in a hydrogen stream at 350° C.

800 ml. of a mixture of 30 volume percent of acrylonitrile and 70 volume percent of n-butanol as well as 10 g. of the above described catalyst are introduced into an autoclave provided with a stirrer and heated under a hydrogen pressure of 220 atmospheres. At 80° C., the absorption of hydrogen starts, which after several hours at 100° C. comes to a standstill after saturation of the double bonds. Since the hydrogenation results in a drop of the pressure, hydrogen consumed is replaced as soon as the value reaches 180 atmospheres. The reaction mass is then permitted to cool, the pressure released, and the hydrogenation product is separated from the catalyst by distilling in an effectively acting packed column. The propionitrile is obtained in practically quantitative yield.

EXAMPLE 6

Under the reaction conditions of Example 5, a mixture of 35 volume percent of acrylonitrile and 70 volume percent of n-butanol is hydrogenated in the presence of a pulverulent catalyst produced by reducing a mixture of 80% by weight of nickel oxide and 20% by weight of tungsten trioxide in pulverulent form at 350° C. in a current of hydrogen. The yield of proprionitrile is practically quantitative.

EXAMPLE 7

The catalyst for this example is obtained by mixing 70% by weight of nickel oxide and 20% by weight of tungsten trioxide with 10% by weight of γ-alumina and subsequently reducing the mixture in a current of hydrogen at 350° C.

A mixture of 30 volume percent of acrylonitrile and 70 volume percent of n-butanol is hydrogenated in the presence of this catalyst under the reaction conditions of Example 5. Only propionitrile is obtained in practically quantitative yield.

EXAMPLE 8

Pulverulent nickel molybdate is used as catalyst. The production of the catalyst proceeds in the following manner: Equimolecular amounts of molybdenum(VI)-oxide and nickel carbonate in aqueous suspension are heated to 80° C. until the development of carbon dioxide has ceased, and the obtained reaction product is subsequently evaporated and dried at 190° C.

800 ml. of a mixture of 30 volume percent of acrylonitrile and 70 volume percent of n-butanol, as well as 10 g. of the previously mentioned nickel molybdate which has first been reduced in a current of hydrogen at 350° C. are heated to 80° C. in an autoclave provided with a stirrer under a hydrogen pressure of 200 atmospheres. At the temperature mentioned, a lively absorption of oxygen occurs. The hydrogenation proceeds with a pressure drop from 220 atmospheres to 180 atmospheres with replacement of the hydrogen consumed. After about 2 hours, the hydrogen absorption comes to a standstill as a result of the completed saturation of the double bonds. After cooling and pressure release, the contents of the autoclave are separated from the catalyst by filtration and subsequently distilled. Only propionitrile is obtained in a yield which corresponds to the theoretical.

EXAMPLE 9

Cobalt tungstate is used as catalyst in pulverulent form, and is obtained in the following manner: Equimolecular amounts of tungstic acid ($WO_3 \cdot H_2O$) and cobalt carbonate in aqueous suspension are warmed to 80° C. until the development of carbon dioxide ceases, and the obtained reaction product is subsequently evaporated and dried at 190° C.

800 ml. of a mixture of 30 volume percent of acrylonitrile and 70 volume percent of n-butanol, as well as 10 g. of the cobalt tungstate which is first reduced in a hydrogen stream at 350° C. are introduced into an autoclave provided with a stirrer and heated to 80° C. under a hydrogen pressure of 200 atmospheres, whereby the take-up of hydrogen commences. As soon as the pressure has fallen to 180 atmospheres, the used hydrogen is replenished. After 10 hours, the take-up of hydrogen ends resulting in a constant pressure. After cooling and removal of the pressure, the catalyst is separated from the hydrogenation product by filtration. After distillation, the propionitrile is obtained in practically quantitative yield.

EXAMPLE 10

Pulverulent cobalt molybdate is used as catalyst, the cobalt molybdate being produced analogously to Example 9 from molybdenum(VI)-oxide and cobalt carbonate. Under the reaction conditions of Example 9, a mixture of 30 volume percent of acrylonitrile and 70 volume percent of n-butanol are hydrogenated in the presence of the reduced cobalt molybdate. The yield of propionitrile is practically quantitative.

EXAMPLE 11

Nickel-cobalt-tungstate in pulverulent form is used as catalyst, and is produced in the following manner: equimolecular amounts of nickel carbonate and cobalt carbonate and the corresponding amount of tungstic acid ($WO_3 \cdot H_2O$) in aqueous suspension are heated to 80° C. until completion of the development of carbon dioxide, and the obtained reaction product is subsequently evaporated and dried at 190° C.

The hydrogenation of the mixture of 30 volume percent of acrylonitrile and 70 volume percent of n-butanol in the presence of the nickel-cobalt-tungstate which has first been reduced in a hydrogen stream at 350° C. takes place in an autoclave provided with a stirrer at 60° C. and under a pressure of 220 atmospheres during 16 hours.

The yield of propionitrile is practically quantitative.

EXAMPLE 12

There is used as catalyst pulverulent nickel chromate which is obtained in the following manner: an aqueous solution of chromium trioxide containing an equimolecular amount of nickel carbonate is heated to 80° C. until carbon dioxide development ceases, and the obtained reaction product is subsequently evaporated and dried at 190° C.

The hydrogenation of a mixture of 30 volume percent of acrylonitrile and 70 volume percent of n-butanol in the presence of the nickel chromate which has first been reduced in a hydrogen stream at 350° C. is carried out in an autoclave provided with a stirrer at a temperature of 80° C. under a pressure of 200 atmospheres during a time period of 3 hours. There is obtained exclusively propionitrile in the theoretical amount.

In the catalyst compositions of the present invention the proportions of the metallic nickel and/or cobalt to the oxide of the metal of the 6th sub-group of the periodic system can vary within rather wide ranges, as is apparent from the above examples. Thus, for example, satisfactory results have been obtained with the proportion of the metallic nickel and/or cobalt to the oxide of the metal of the 6th sub-group of the periodic table between 10:1 and 1:10 by weight, and even wider proportions can be used without difficulty.

What is claimed is:

1. Method of producing propionitrile by the catalytic hydrogenation of acrylonitrile, which comprises hydrogenating acrylonitrile at a temperature of about 50 to 120° C. and under superatmospheric hydrogen pressure in the presence of a catalyst composition consisting essentially of at least one of metallic nickel and metallic cobalt plus at least one of a molybdenum oxide, a chromium oxide and a tungsten oxide.

2. Method according to claim 1, wherein said catalyst composition includes a carrier selected from the group consisting of alumina, kieselguhr, aluminum silicate and pumice.

3. Method according to claim 1, wherein said superatmospheric pressure is at least 10 atmospheres.

4. Method according to claim 1, wherein said acrylonitrile is subjected to hydrogenation in a solution thereof in a solvent which does not react under the conditions of said hydrogenation.

5. Method according to claim 4, wherein said solvent is selected from the group consisting of saturated aliphatic and cycloaliphatic hydrocarbons, alcohols and propionitrile.

References Cited

UNITED STATES PATENTS 3,078,297   2/1963   Smeykal et al. _____ 260—465.1

JOSEPH P. BRUST, *Primary Examiner.*

U.S. Cl. X.R.

252—458, 470